United States Patent
Pai et al.

(10) Patent No.: US 10,474,267 B2
(45) Date of Patent: Nov. 12, 2019

(54) TOUCH DISPLAY APPARATUS

(71) Applicant: Au Optronics Corporation, Hsinchu (TW)

(72) Inventors: Cheng-Chui Pai, Changhua County (TW); Ming-Hung Chuang, Tainan (TW)

(73) Assignee: Au Optronics Corporation, Hsinchu (TW)

( * ) Notice: Subject to any disclaimer, the term of this patent is extended or adjusted under 35 U.S.C. 154(b) by 94 days.

(21) Appl. No.: 15/901,909

(22) Filed: Feb. 22, 2018

(65) Prior Publication Data

US 2018/0246607 A1    Aug. 30, 2018

(30) Foreign Application Priority Data

Feb. 24, 2017   (TW) .............................. 106106438 A

(51) Int. Cl.
*G06F 3/041*     (2006.01)
*G09G 3/20*      (2006.01)
*G06F 1/3234*    (2019.01)

(52) U.S. Cl.
CPC .......... *G06F 3/0412* (2013.01); *G06F 1/3265* (2013.01); *G06F 3/0416* (2013.01); *G09G 3/2096* (2013.01); *G09G 2310/0283* (2013.01); *G09G 2310/0286* (2013.01); *G09G 2310/061* (2013.01); *G09G 2330/022* (2013.01); *G09G 2354/00* (2013.01); *Y02D 10/153* (2018.01)

(58) Field of Classification Search
CPC .... G06F 3/0412; G06F 3/0416; G06F 1/3265; G09G 3/2096; G09G 2354/00; G09G 2330/022; G09G 2310/0286; G09G 2310/0283; G09G 2310/061; Y02D 10/153

See application file for complete search history.

(56) References Cited

U.S. PATENT DOCUMENTS

| | | | |
|---|---|---|---|
| 9,600,110 B2 | 3/2017 | Noguchi et al. | |
| 2013/0234954 A1* | 9/2013 | Koide | G06F 3/0488 345/173 |
| 2013/0241814 A1* | 9/2013 | Hirabayashi | G09G 3/3677 345/100 |
| 2014/0192019 A1* | 7/2014 | Fukushima | G06F 3/0412 345/174 |
| 2014/0362042 A1 | 12/2014 | Noguchi et al. | |
| 2017/0115808 A1* | 4/2017 | Cho | G06F 3/0412 |
| 2017/0147136 A1 | 5/2017 | Noguchi et al. | |

FOREIGN PATENT DOCUMENTS

| | | |
|---|---|---|
| CN | 104238850 | 12/2014 |
| TW | I552131 | 10/2016 |

* cited by examiner

*Primary Examiner* — Premal R Patel
(74) *Attorney, Agent, or Firm* — JCIPRNET

(57) ABSTRACT

A touch display apparatus including a touch display panel and a control circuit is provided. The touch display panel includes a touch display array, a gate driver, and a sleep driving circuit. The gate driver is coupled to the touch display array to sequentially provide a plurality of gate driving signals. The sleep driving circuit is coupled to the touch display array. The control circuit is coupled to the gate driver and the sleep driving circuit. When the touch display apparatus enters a sleep state, the sleep driving circuit is turned on. The control circuit cuts off the gate driver during a display period and transmits a driving pulse to the touch display array through the sleep driving circuit during a touch sensing period.

10 Claims, 8 Drawing Sheets

TOUCH DISPLAY APPARATUS

CROSS-REFERENCE TO RELATED APPLICATION

This application claims the priority benefit of Taiwan application serial no. 106106438, filed on Feb. 24, 2017. The entirety of the above-mentioned patent application is hereby incorporated by reference herein and made a part of this specification.

BACKGROUND OF THE INVENTION

1. Field of the Invention

The invention relates to a touch display technology. More particularly, the invention relates to a touch display apparatus.

2. Description of Related Art

In existing electronic apparatuses, power is provided mainly by external power supplies or built-in batteries. To bring greater convenience, some electronic apparatuses even rely only on built-in batteries to obtain power. Thereby, lowering power consumption is important for electronic apparatuses, and systems of the electronic apparatuses may enter a sleep state in which less electricity is consumed.

When an electronic apparatus is in the sleep state, a black screen is displayed on a display interface of the electronic apparatus, meaning that a display apparatus of the electronic apparatus is in the off state. At this time, if a touch module of the electronic apparatus is integrated into a display panel of the electronic apparatus, and since the display apparatus is in the off state, the touch module may not be operable. If the touch module is required to perform the detection function when the electronic apparatus is in the sleep state, the display apparatus of the electronic apparatus has to continuously display the black screen during the sleep state.

However, if the black screen is shown continuously when the display apparatus of the electronic apparatus is in the sleep state, electricity consumption of the electronic apparatus cannot be lowered, and reduction in power consumption of the electronic device consequently fails.

SUMMARY OF THE INVENTION

The invention provides a touch display apparatus, wherein a display portion may be turned off completely, and a touch portion may continue to operate when the touch display apparatus enters a sleep state.

In an embodiment of the invention, a touch display apparatus includes a touch display panel and a control circuit. The touch display panel includes a touch display array, a gate driver, and a sleep driving circuit. The touch display array has a plurality of touch display pixels and a plurality of gate lines. The gate driver is coupled to the gate lines and has a plurality of shift registers. The shift registers sequentially provide a plurality of gate driving signals to the gate lines. The sleep driving circuit is coupled to the gate lines and receives a first signal and a gate turn-off signal. Here, the sleep driving circuit is controlled by the gate turn-off signal. The control circuit is coupled to the gate driver and the sleep driving circuit. The gate turn-off signal is enabled to turn on the sleep driving circuit when the touch display apparatus enters a sleep state. The control circuit turns off the shift registers during a display period and transmits the first signal to the gate lines during a touch sensing period. The first signal is a driving pulse.

In view of the above, the driving pulses are provided to the touch display pixels through the sleep driving circuit when the touch display apparatus provided by the embodiments of the invention is in the sleep state. As such, the shift registers of the gate drivers may be turned off completely, and less electric power is thus consumed by the touch display apparatus in the sleep state while the touch module continues to operate.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
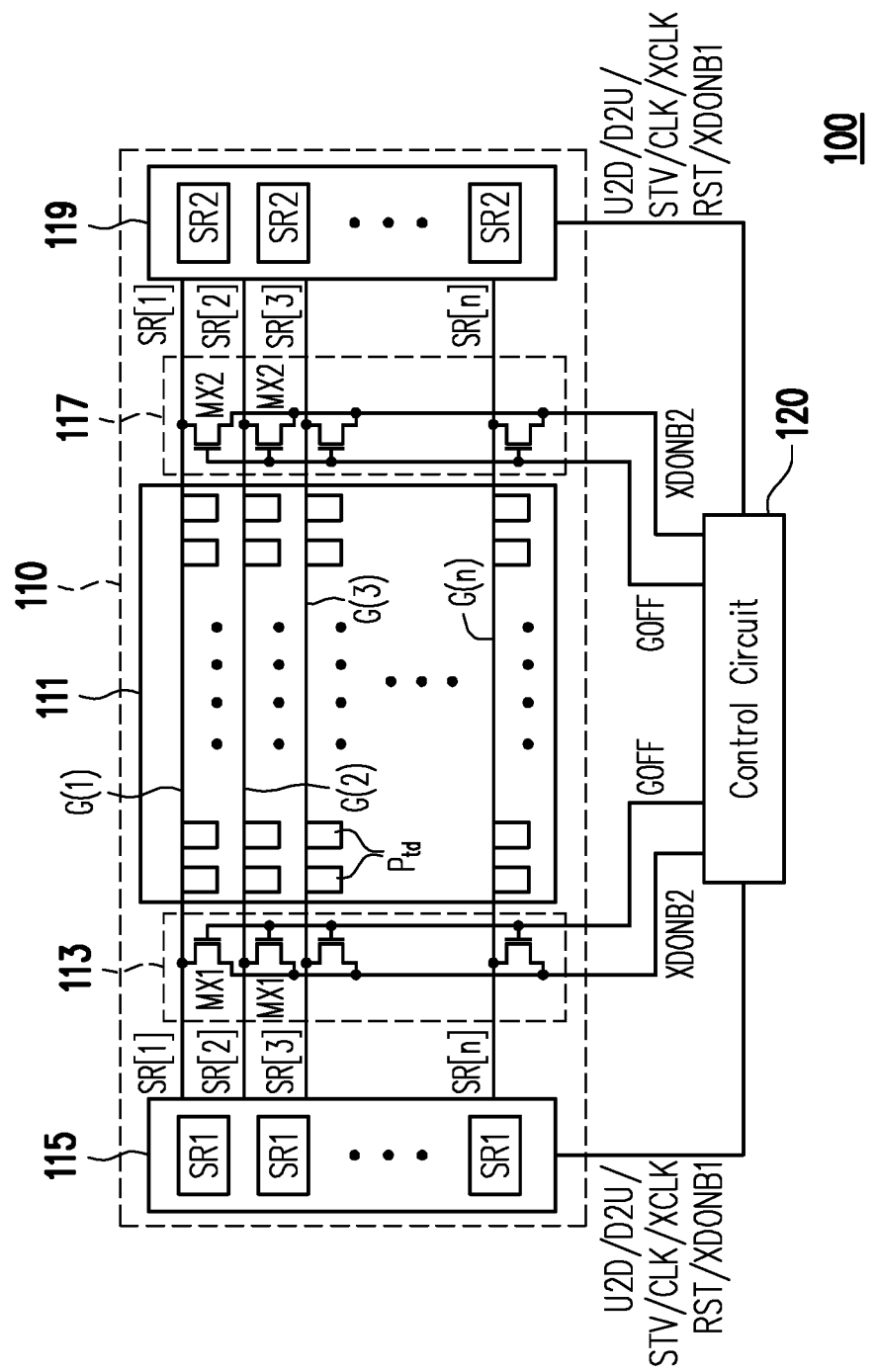
FIG. 1 is a schematic diagram showing a system of a touch display apparatus according to an embodiment of the invention.

FIG. 1 is a schematic diagram showing a system of a touch display apparatus according to an embodiment of the invention. Referring to FIG. 1, in the embodiment, a touch display apparatus 100 includes a touch display panel 110 and a control circuit 120. The touch display panel 110 includes a touch display array 111, sleep driving circuits 113 and 117, and gate drivers 115 and 119. The control circuit 120 is, for example, a timing controller or another similar circuit.

The touch display array 111 has a plurality of touch display pixels Ptd and a plurality of gate lines G(1) to G(n), and n is a positive integer. The gate drivers 115 and 119 are disposed on two sides (i.e., the left side and the right side) of the touch display array 111 and are commonly coupled to the gate lines G(1) to G(n). Each of the gate drivers 115 and 119 has a plurality of shift registers (e.g., SR1 and SR2). The shift registers (e.g., SR1 and SR2) receives a forward scanning signal U2D, a reverse scanning signal D2U, a start signal STV, a clock signal CLK, an inverse clock signal XCLK, a reset signal RST, and a first signal XDONB1 to sequentially provide gate driving signals SR[1] to SR[n] to the gate lines G(1) to G(n).

The sleep driving circuits 113 and 117 are respectively disposed on the two sides of the touch display array 111 (i.e., the left side and the right side) and are respectively disposed between the gate drivers 115 and 119 and the touch display array 111. The sleep driving circuits 113 and 117 are commonly coupled to the gate lines G(1) to G(n) and receive a second signal XDONB2 and a gate turn-off signal GOFF. The sleep driving circuits 113 and 117 are controlled by the gate turn-off signal GOFF and thus are turned on.

The control signal 120 is coupled to the gate drivers 115 and 119 and the sleep driving circuits 113 and 117 to provide the forward scanning signal U2D, the reverse scanning signal D2U, the start signal STV, the clock signal CLK, the inverse clock signal XCLK, the reset signal RST, the first signal XDONB1, the second signal XDONB2, and the gate turn-off signal GOFF.

When the touch display apparatus 100 is in a normal operation state, the control circuit 120 provides the disabled gate turn-off signal GOFF (e.g., at low voltage level), so as to turn off the sleep driving circuits 113 and 117. The gate drivers 115 and 119 sequentially provides the enabled gate driving signals SR[1] to SR[n] (e.g., at high voltage level) to the gate lines G(1) to G(n) according to the forward scanning signal U2D, the reverse scanning signal D2U, the start signal STV, the clock signal CLK, the inverse clock signal XCLK, the reset signal RST, and the first signal XDONB1 provided by the control circuit 120.

When the touch display apparatus 100 enters a sleep state, the control circuit 120 provides the enabled gate turn-off signal GOFF (e.g., at high voltage level) to the sleep driving circuits 113 and 117 to turn on the sleep driving circuits 113 and 117. The second signal XDONB2 is transmitted to the gate lines G(1) to G(n) through the turned-on sleep driving circuits 113 and 117, such that a touch operation is performed by the touch display array 111. The control circuit 120 turns off the gate drivers 115 and 119 through the forward scanning signal U2D, the reverse scanning signal D2U, the start signal STV, the clock signal CLK, the inverse clock signal XCLK, the reset signal RST, and the first signal XDONB1. In some embodiments, the forward scanning signal U2D, the reverse scanning signal D2U, the start signal STV, the clock signal CLK, the inverse clock signal XCLK, and the reset signal RST are all at low voltage level or at a ground voltage when the touch display apparatus 100 enters the sleep state.

In an embodiment, each of the sleep driving circuits 113 and 117 includes a plurality of switches, and transistors MX1 and MX2 are taken for example. A source of each of the transistors MX1 or MX2 (corresponding to a first terminal of each of the switches) is coupled to the corresponding gate lines G(1) to G(n), a gate of each of the transistors MX1 or MX2 (corresponding to a control terminal of each of the switch) receives the gate turn-off signal GOFF, and a drain of each of the transistors MX1 or MX2 (corresponding to a second terminal of each of the switches) receives the second signal XDONB2. In an embodiment, the control terminals of the switches are connected to each other, the second terminals of the switches are also connected to each other.

In the foregoing embodiments, two sleep driving circuits 113 and 117 and two gate drivers 115 and 119 are taken for example, but in other embodiments the number of the sleep driving circuits 113 and 117 may be one, and so is the number of the gate drivers 115 and 119. The numbers of the sleep driving circuit and the gate drivers may be determined according to the dimensions and the circuit design of the touch display array 111, and the embodiments of the invention are not limited thereto.

Figure 2A:
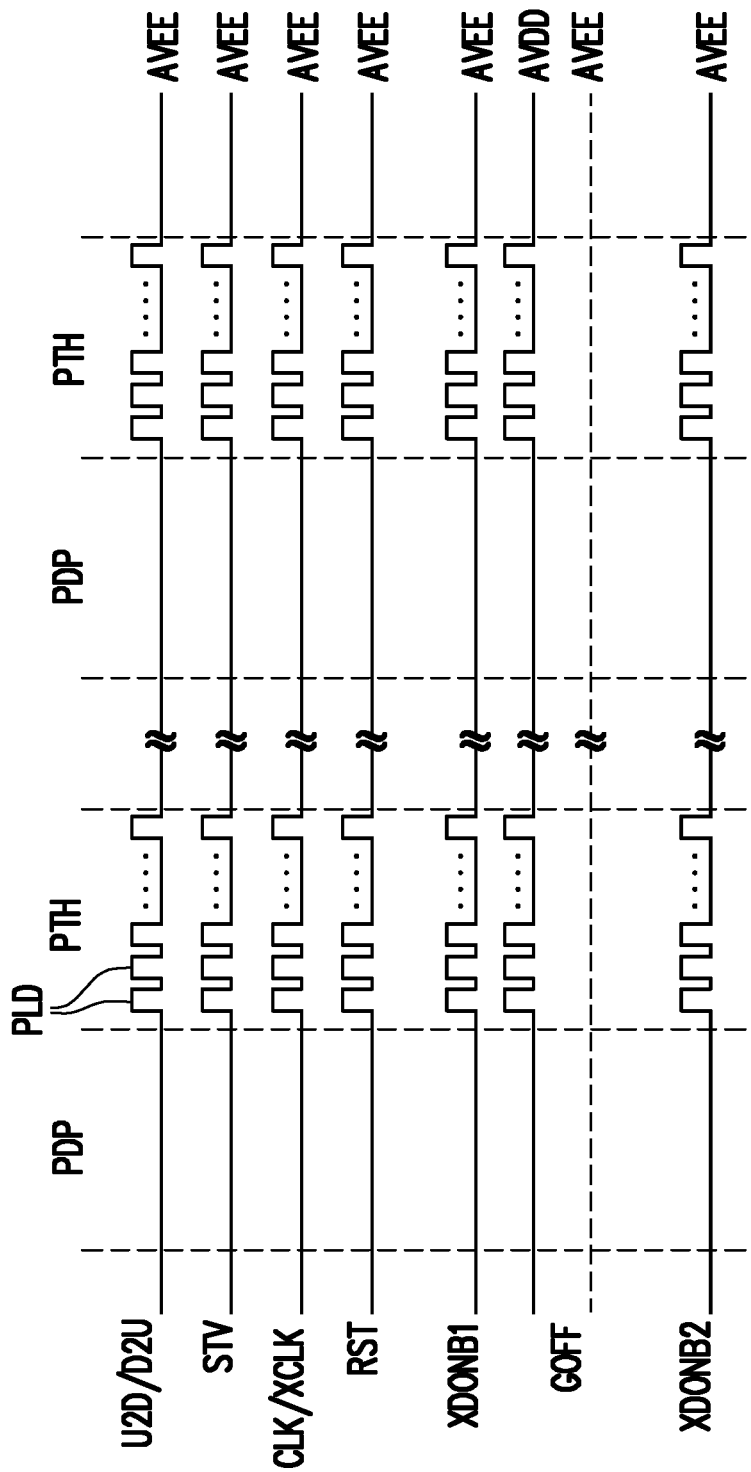
FIG. 2A to FIG. 2E are respectively schematic diagrams illustrating waveforms of a control signal of a touch display apparatus according to an embodiment of the invention.

FIG. 2A to FIG. 2E are respectively schematic diagrams illustrating waveforms of a control signal of a touch display apparatus according to an embodiment of the invention. Referring to FIG. 1 and FIG. 2A, in the present embodiment, it is assumed that the touch display apparatus 100 enters the sleep state, and the gate turn-off signal GOFF is set as a power-high voltage AVDD. During a display period PDP, the control circuit 120 sets the forward scanning signal U2D, the reverse scanning signal D2U, the start signal STV, the clock signal CLK, the inverse clock signal XCLK, the reset signal RST, and the first signal XDONB1 to be the power-low voltage AVEE, so as to turn off the gate drivers 115 and 119 through the forward scanning signal U2D, the reverse scanning signal D2U, the start signal STV, the clock signal CLK, the inverse clock signal XCLK, the reset signal RST, and the first signal XDONB1.

During a touch sensing period PTH, a plurality of driving pulses PLD are formed by the second signal XDONB2 to transmit the driving pulses PLD to the gate lines G(1) to G(n) through the sleep driving circuits 113 and 117, such that the touch operation is performed by the touch display apparatus 100. In the embodiment, the control circuit 120 allows driving waveforms generated by the forward scanning signal U2D, the reverse scanning signal D2U, the start signal STV, the clock signal CLK, the inverse clock signal XCLK, the reset signal RST, the first signal XDONB1, and the gate turn-off signal GOFF to be identical to that of the driving pulses PLD generated by the second signal XDONB2, such that coupling effects resulting from the touch display array 111 are lessened. However, other embodiments of the invention are not limited thereto. In other words, in other embodiments of the invention, the forward scanning signal U2D, the reverse scanning signal D2U, the start signal STV, the clock signal CLK, the inverse clock signal XCLK, the reset signal RST, and the first signal XDONB1 may be maintained at the power-low voltage AVEE or the ground voltage GND.

In the embodiment, the first signal XDONB1 and the second signal XDONB2 share the same functions and waveforms; thereby, in some embodiments, the first signal XDONB1 and the second signal XDONB2 may be designed as the same signal, which may be determined by the circuit design of the touch display array 111. The invention is not limited thereto.

In the embodiments of the invention, the display period PDP may be configured to display an entire frame or a partial frame. Moreover, the length of each display period PDP is the same, and the length of each touch sensing period PTH are the same.

Figure 2B:
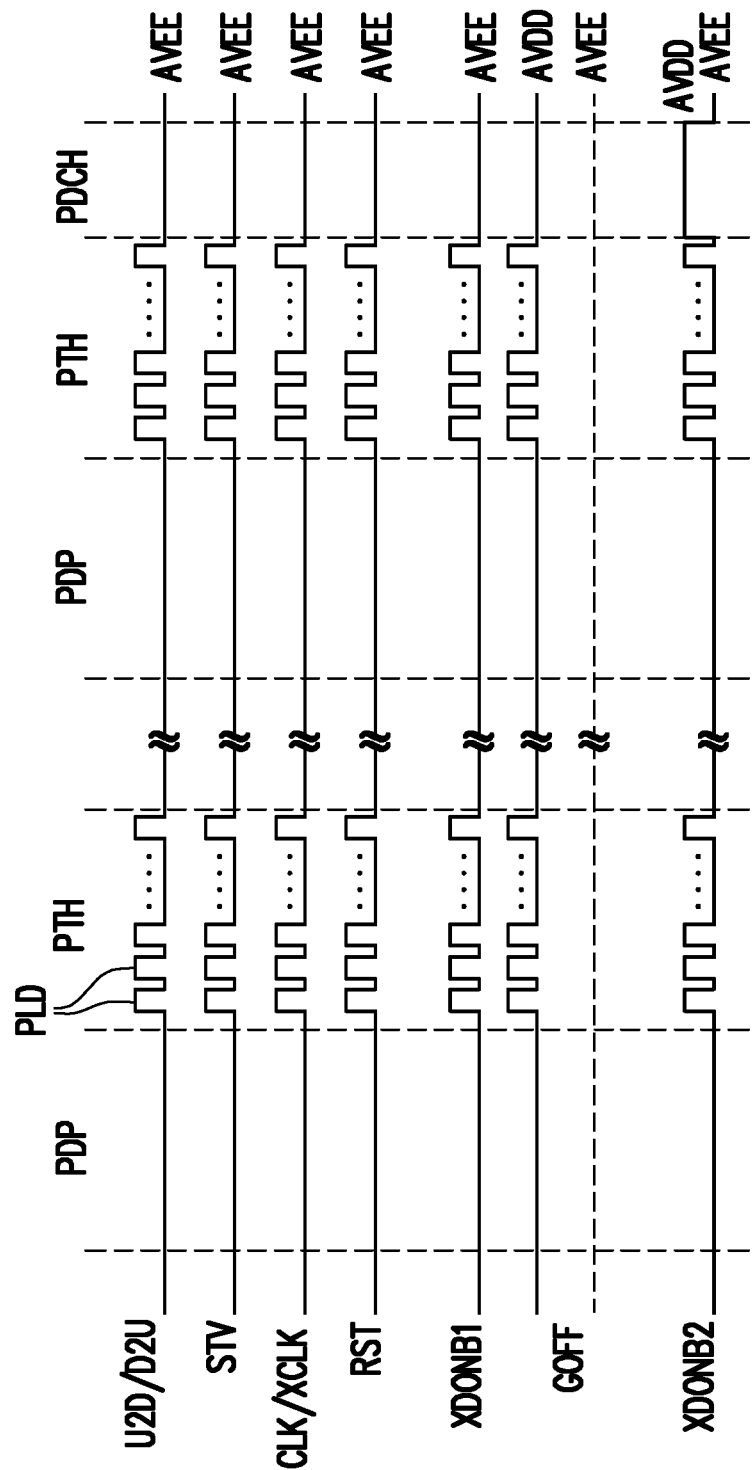

Referring to FIG. 1, FIG. 2A, and FIG. 2B, in the embodiment, FIG. 2B and FIG. 2A are substantially the same, and differences therebetween include that a display discharging period PDCH exists in the embodiment. During the display discharging period PDCH, the second signal XDONB2 is set to be the power-high voltage AVDD. In other words, the second signal XDONB2 is set to be the power-high voltage AVDD every predetermined time period by the control circuit 120 when the touch display apparatus 100 enters the sleep state, so as to discharge the charges of the touch display pixels Ptd. The predetermined time period may be greater than 0.5 second and less than 1 second and may be adjusted by people having ordinary skill in the art. The embodiments of the invention are not limited thereto.

Figure 2C:
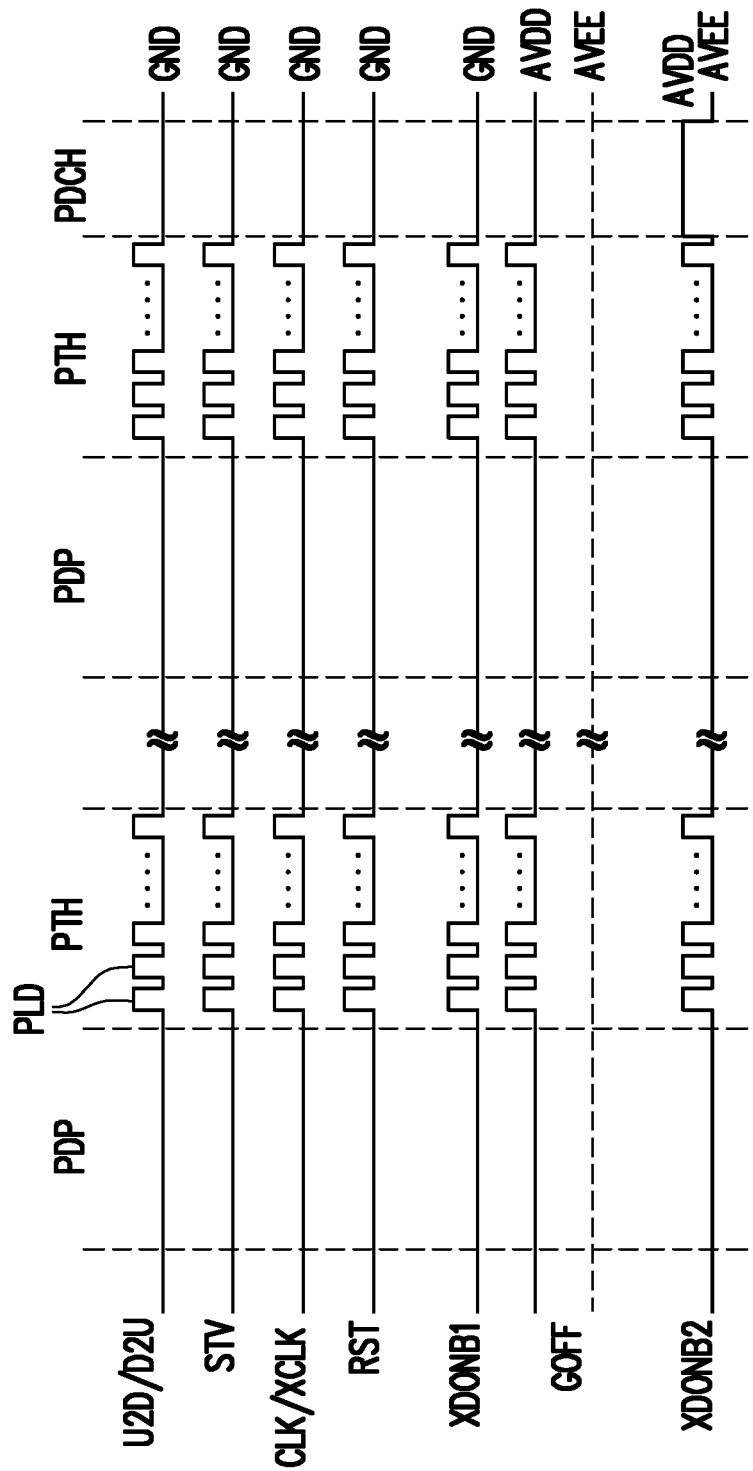

Referring to FIG. 1, FIG. 2B, and FIG. 2C, in the embodiment, FIG. 2C and FIG. 2B are substantially the same, and differences therebetween include that the forward scanning signal U2D, the reverse scanning signal D2U, the start signal STV, the clock signal CLK, the inverse clock signal XCLK, the reset signal RST, and the first signal XDONB1 are substantially set to be the ground voltages GND during the display discharging period PDCH to reduce the load of a power circuit. In other words, when a user intends to set voltages of the terminals by himself/herself, the voltage levels of the forward scanning signal U2D, the reverse scanning signal D2U, the start signal STV, the clock signal CLK, the inverse clock signal XCLK, the reset signal RST, and the first signal XDONB1 may be changed through the control circuit 120. Such changes may be made by people having ordinary skill in the art, which should not be construed as limitations to the invention.

Figure 2D:
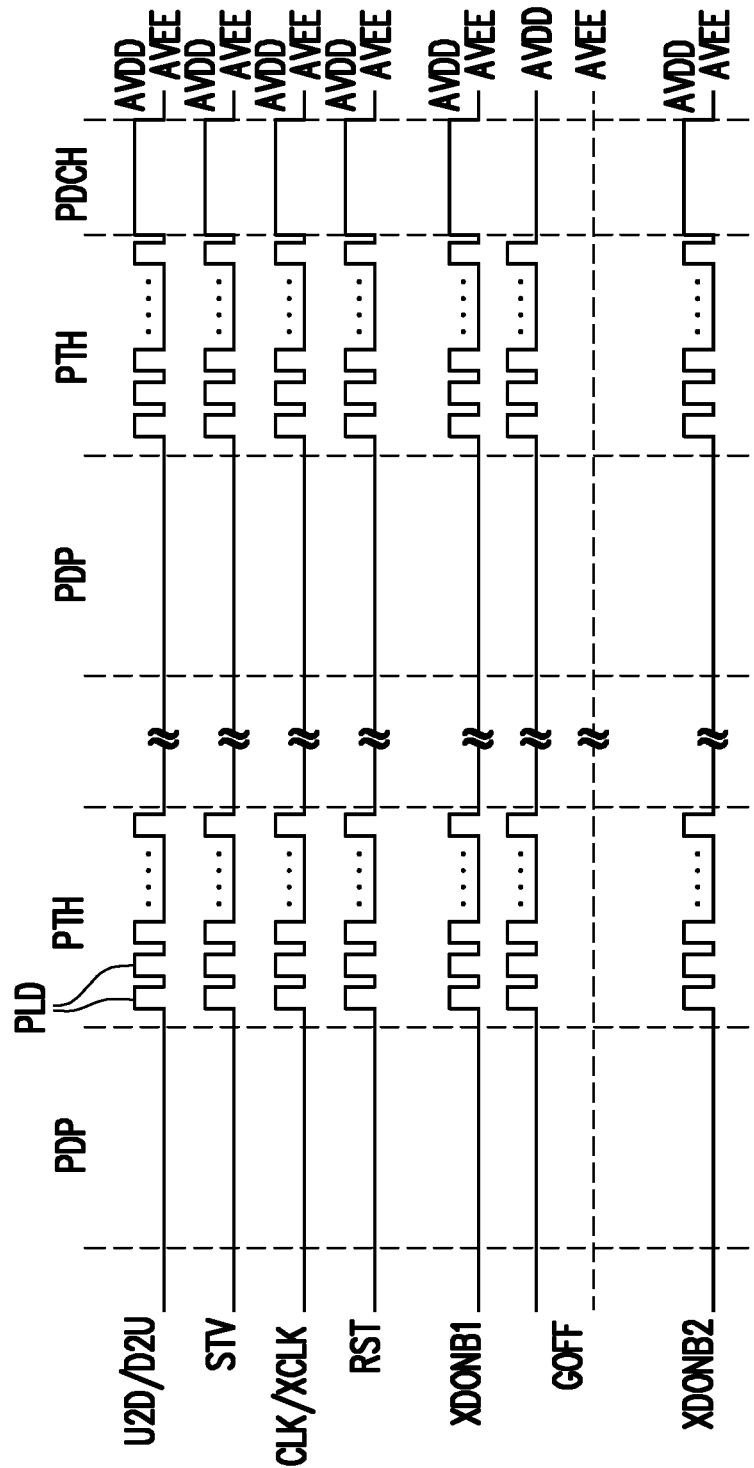

Referring to FIG. 1, FIG. 2B, and FIG. 2D, in the embodiment, FIG. 2D and FIG. 2B are substantially the same, and differences therebetween include that the forward scanning signal U2D, the reverse scanning signal D2U, the start signal STV, the clock signal CLK, the inverse clock signal XCLK, the reset signal RST, and the first signal XDONB1 are substantially set to be the power-high voltages AVDD during the display discharging period PDCH, so as to discharge the charges in the touch display pixels Ptd and to enhance display quality.

Figure 2E:
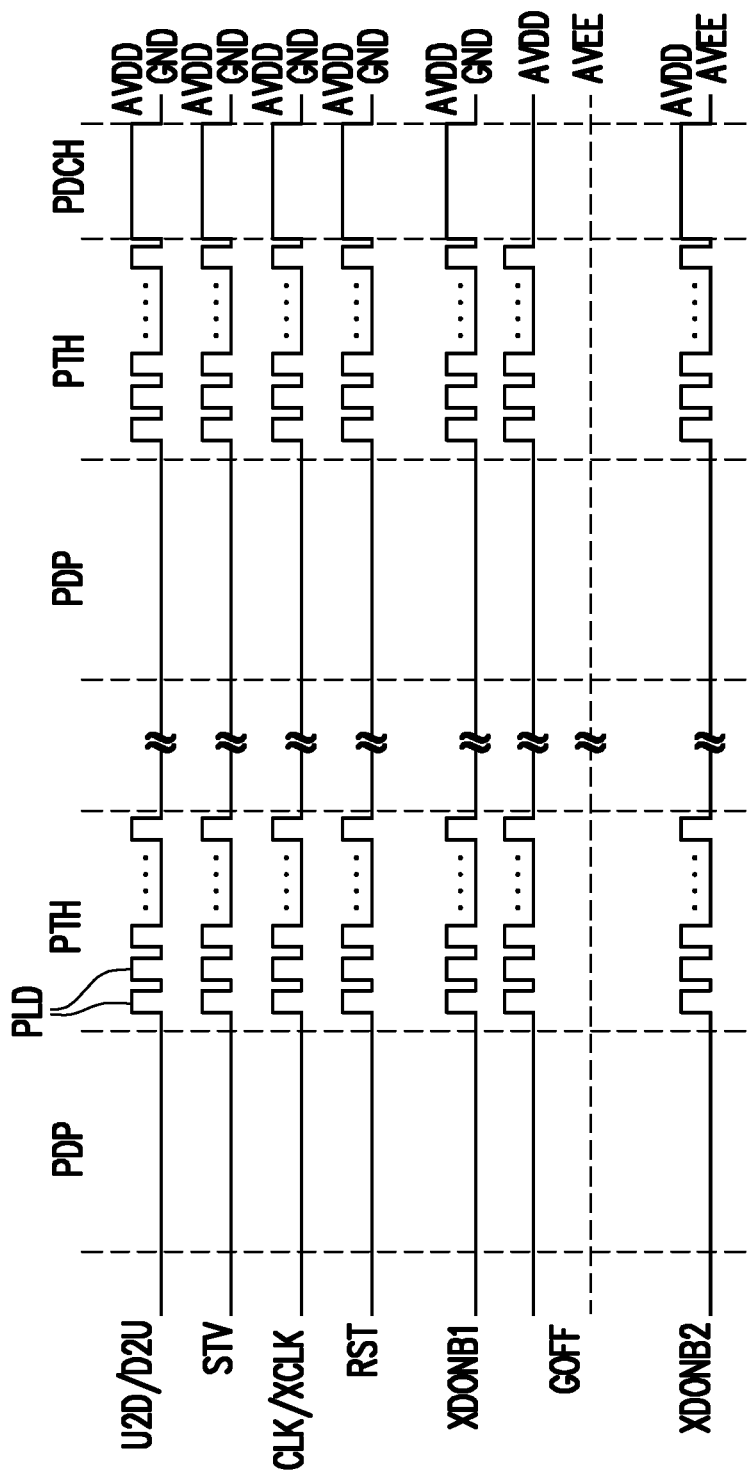

Referring to FIG. 1, FIG. 2D, and FIG. 2E, in the embodiment, FIG. 2E and FIG. 2D are substantially the same, and differences therebetween include that the voltage levels of the forward scanning signal U2D, the reverse scanning signal D2U, the start signal STV, the clock signal CLK, the inverse clock signal XCLK, the reset signal RST, and the first signal XDONB1 are set to be the ground voltages GND during the display discharging period PDCH to reduce the load of the power circuit.

Figure 3:
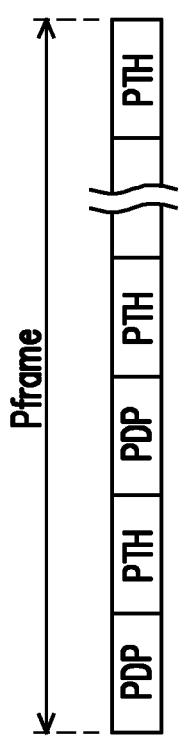
FIG. 3 is a time schematic diagram of a frame period according to an embodiment of the invention.

FIG. 3 is a schematic diagram of a frame period according to an embodiment of the invention. Referring to FIG. 1 and FIG. 3, in the embodiment, a plurality of display periods PDP and a plurality of sensing periods PTH are alternately arranged during a frame period Pframe.

Figure 4:
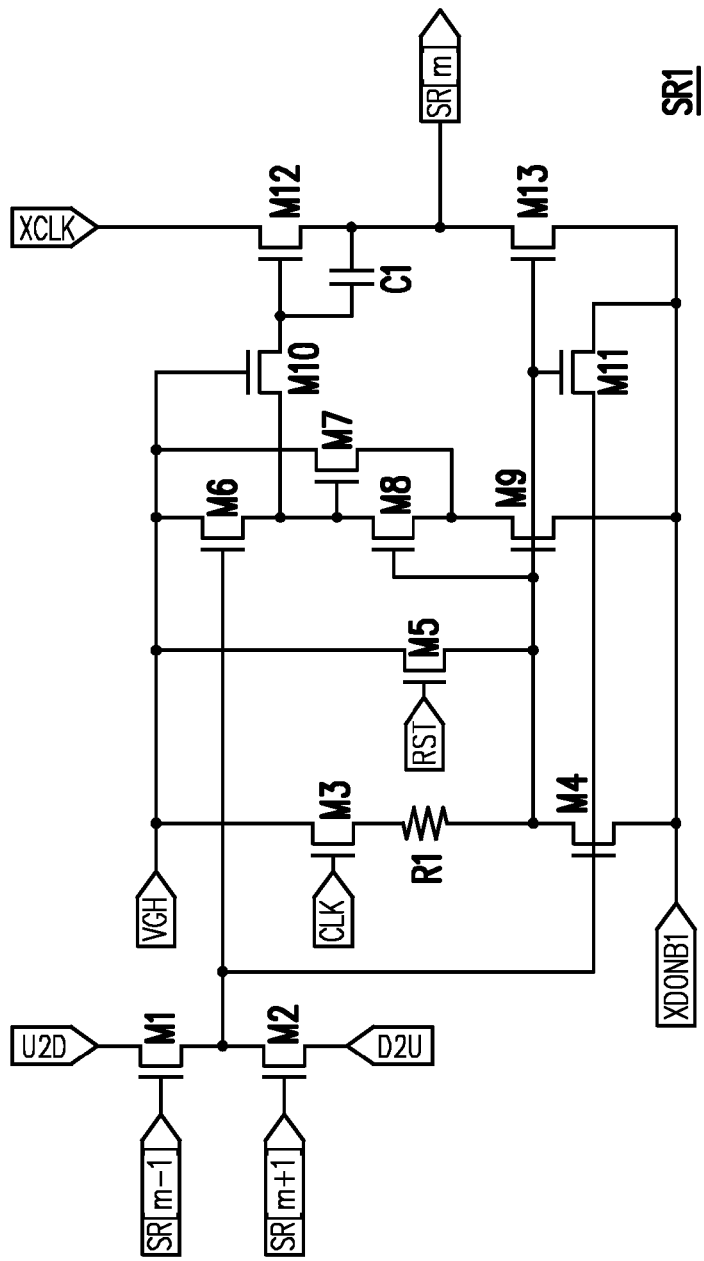
FIG. 4 is a schematic diagram of circuits in a shift register of a touch display apparatus according to an embodiment of the invention.

FIG. 4 is a schematic diagram of circuits in a shift register of a touch display apparatus according to an embodiment of the invention. Referring to FIG. 1 and FIG. 4, in the embodiment, each of the shift registers SR1 and SR2 (herein SR1 is exemplarily shown) includes transistors M1 to M13 (corresponding to the first transistor to the thirteenth transistor), a first resistor R1, and a first capacitor C1. The first capacitor C1 may be a metal oxide semiconductor capacitor, but the embodiments of the invention are not limited thereto. The forward scanning signal U2D is received by a first source/drain terminal of the transistor M1, and the previous gate driving signal SR[m−1] is received by a gate terminal of the transistor M1, wherein m is a positive integer and is less than and equal to n.

A first source/drain terminal of the transistor M2 is coupled to a second source/drain terminal of the transistor M1, a gate terminal of the transistor M2 receives a subsequent gate driving signal SR[m+1], and a second source/drain terminal of the transistor M2 receives the reverse scanning signal D2U. A first source/drain terminal of the transistor M3 receives a gate high voltage VGH, and a gate terminal of the transistor M3 receives the clock signal CLK. A first source/drain terminal of the transistor M4 is coupled to a second source/drain terminal of the transistor M3 through the first resistor R1, meaning that the first resistor R1 is coupled between the second source/drain terminal of the transistor M3 and the first source/drain terminal of the transistor M4. A gate terminal of the transistor M4 is coupled to the second source/drain terminal of the transistor M1, and a second source/drain tell sinal of the transistor M4 receives the first signal XDONB1.

A first source/drain terminal of the transistor M5 receives the gate high voltage VGH, a gate terminal of the transistor M5 receives the reset signal RST, and a second source/drain terminal of the transistor M5 is coupled to the first source/drain terminal of the transistor M4. A first source/drain terminal of the transistor M6 receives the gate high voltage VGH, and a gate terminal of the transistor M6 is coupled to the second source/drain terminal of the transistor M1. A first source/drain terminal of the transistor M7 receives the gate high voltage VGH, and a gate terminal of the transistor M7 is coupled to a second source/drain terminal of the transistor M6.

A first source/drain terminal of the transistor M8 is coupled to the second source/drain terminal of the transistor M6, a gate terminal of the transistor M8 is coupled to the first source/drain terminal of the transistor M4, and a second source/drain terminal of the transistor M8 is coupled to a second source/drain terminal of the transistor M7. A first source/drain terminal of the transistor M9 is coupled to the second source/drain terminal of the transistor M8, a gate terminal of the transistor M9 is coupled to the first source/drain terminal of the transistor M4, and a second source/drain terminal of the transistor M9 receives the first signal XDONB1.

A first source/drain terminal of the transistor M10 is coupled to the second source/drain terminal of the transistor M6, and a gate terminal of the transistor M10 receives the gate high voltage VGH. A first source/drain terminal of the transistor M11 is coupled to the second source/drain terminal of the transistor M1, a gate terminal of the transistor M11 is coupled to the first source/drain terminal of the transistor M4, and a second source/drain terminal of the transistor M11 receives the first signal XDONB1. A first source/drain terminal of the transistor M12 receives the inverse clock signal XCLK, a gate terminal of the transistor M12 is coupled to a second source/drain terminal of the transistor M10, and a second source/drain terminal of the transistor M12 is coupled to the corresponding gate lines G(1) to G(n) to provide the corresponding gate driving signal SR(m).

The first capacitor C1 is coupled between the gate terminal of the transistor M12 and the second source/drain terminal of the transistor M12. A first source/drain terminal of the transistor M13 is coupled to the second source/drain terminal of the transistor M12, a gate terminal of the transistor M13 is coupled to the first source/drain terminal of the transistor M4, and a second source/drain terminal of the transistor M13 receives the first signal XDONB1.

Figure 5:
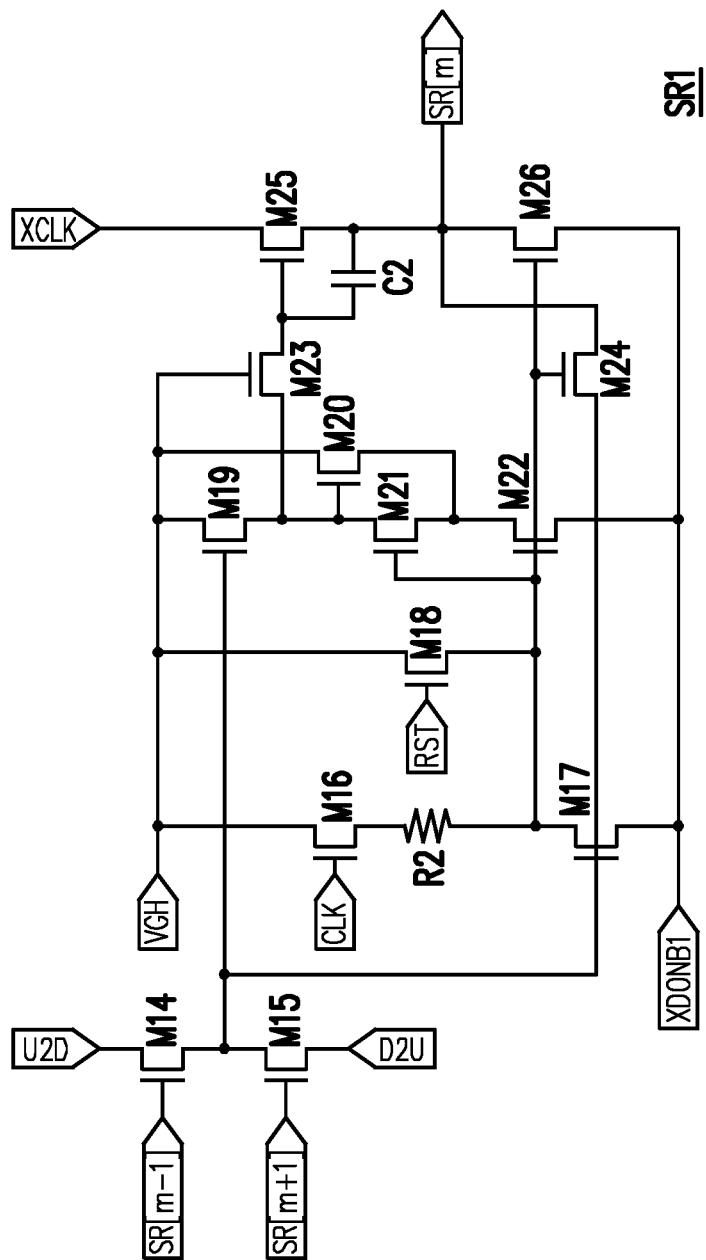
FIG. 5 is a schematic diagram of circuits in a shift register of a touch display apparatus according to another embodiment of the invention.

FIG. 5 is a schematic diagram of circuits in a shift register of a touch display apparatus according to another embodiment of the invention. Referring to FIG. 1 and FIG. 5, in the embodiment, each of the shift registers SRI and SR2 (SR1 is exemplarily shown here) includes transistors M14 to M26 (corresponding to the fourteenth transistor to the twenty-sixth transistor), a second resistor R2, and a second capacitor C2. The second capacitor C2 may be a metal oxide semiconductor capacitor, but the invention is not limited thereto. A first source/drain terminal of the transistor M14 receives the forward scanning signal U2D, and a gate terminal of the transistor M14 receives the previous gate driving signal SR[m−1]. Here, m is a positive integer and is less than and equal to n.

A first source/drain terminal of the transistor M15 is coupled to a second source/drain terminal of the transistor M14, a gate terminal of the transistor M15 receives the subsequent gate driving signal SR[m+1], and a second source/drain terminal of the transistor M15 receives the reverse scanning signal D2U. A first source/drain terminal of the transistor M16 receives the gate high voltage VGH, and a gate terminal of the transistor M16 receives the clock signal CLK. A first source/drain terminal of the transistor M17 is coupled to a second source/drain terminal of the transistor M16 through the second resistor R2, meaning that the second resistor R2 is coupled between the second source/drain terminal of the transistor M16 and the first source/drain terminal of the transistor M17. A gate terminal of the transistor M17 is coupled to a second source/drain terminal of the transistor M14, and a second source/drain terminal of the transistor M17 receives the first signal XDONB1.

A first source/drain terminal of the transistor M18 receives the gate high voltage VGH, a gate terminal of the transistor M18 receives the reset signal RST, and a second source/drain terminal of the transistor M18 is coupled to the first source/drain terminal of the transistor M17. A first source/drain terminal of the transistor M19 receives the gate high voltage VGH, and a gate terminal of the transistor M19 is coupled to the second source/drain terminal of the transistor M14. A first source/drain terminal of the transistor M20 receives the gate high voltage VGH, and a gate terminal of the transistor M20 is coupled to a second source/drain terminal of the transistor M19.

A first source/drain terminal of the transistor M21 is coupled to the second source/drain terminal of the transistor M19, a gate terminal of the transistor M21 is coupled to the first source/drain terminal of the transistor M17, and a second source/drain terminal of the transistor M21 is coupled to a second source/drain terminal of the transistor M20. A first source/drain terminal of the transistor M22 is coupled to the second source/drain terminal of the transistor M21, a gate terminal of the transistor M22 is coupled to the first source/drain terminal of the transistor M17, and a second source/drain terminal of the transistor M22 receives the first signal XDONB1.

A first source/drain terminal of the transistor M23 is coupled to the second source/drain terminal of the transistor M19, and a gate terminal of the transistor M23 receives the gate high voltage VGH. A first source/drain terminal of the transistor M24 is coupled to the second source/drain terminal of the transistor M14, a gate terminal of the transistor M24 is coupled to the first source/drain terminal of the transistor M17, and a second source/drain terminal of the transistor M24 is coupled to the corresponding gate lines G(1) to G(n). A first source/drain terminal of the transistor M25 receives the inverse clock signal XCLK, a gate terminal of the transistor M25 is coupled to a second source/drain terminal of the transistor M23, and a second source/drain terminal of the transistor M25 is coupled to the corresponding gate lines G(1) to G(n) to provide the corresponding gate driving signal SR(m).

The second capacitor C2 is coupled between the gate terminal of the transistor M25 and the second source/drain terminal of the transistor M25. A first source/drain terminal of the transistor M26 is coupled to the second source/drain terminal of the transistor M25, a gate terminal of the transistor M26 is coupled to the first source/drain terminal of the transistor M17, and a second source/drain terminal of the transistor M26 receives the first signal XDONB1.

In the foregoing embodiments, the terminologies "first" and "second" are applied to describe the components, but such terminology should not limit the components in the foregoing embodiments. Moreover, the terminology is used to distinguish one component from another, and therefore the first component may be named as the second component without departing from the scope or spirit of the invention.

In view of the foregoing, the driving pulses are provided to the touch display pixels through the sleep driving circuit when the touch display apparatus provided by the embodiments of the invention is in the sleep state. As such, the shift registers of the gate drivers may be turned off completely, and less electric power is thus consumed by the touch display apparatus in the sleep state while the touch module continues to operate. Moreover, during the touch sensing period, the driving pulses may be generated in the forward scanning signal, the reverse scanning signal, the start signal, the clock signal, the inverse clock signal, the reset signal, the first signal, and the gate turn-off signal to lessen the coupling effects resulting from the touch display array. The second signal may be set to be the power-high voltage every predetermined time period when the touch display apparatus enters the sleep state, so as to turn on all the touch display pixels of the touch display array. Further, charges of the touch display pixels may be discharged, and accumulation of charges can thus be prevented from affecting the frame display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch display apparatus, comprising:
   a touch display panel, comprising:
      a touch display array, having a plurality of touch display pixels and a plurality of gate lines;
      a gate driver, coupled to the gate lines and having a plurality of shift registers, wherein the shift registers provide a plurality of gate driving signals to the gate lines; and
      a sleep driving circuit, coupled to the gate lines and receiving a first signal and a gate turn-off signal, wherein the sleep driving circuit is controlled by the gate turn-off signal; and
   a control circuit, coupled to the gate driver and the sleep driving circuit,
   wherein the gate turn-off signal is enabled to turn on the sleep driving circuit when the touch display apparatus enters a sleep state, the control circuit cuts off the shift registers during a display period and transmits the first signal to the gate lines during a touch sensing period, and the first signal is a driving pulse.

2. The touch display apparatus as claimed in claim 1, wherein the sleep driving circuit includes a plurality of switches, wherein a first terminal of each of the switches are coupled to the corresponding gate lines, a control terminal of each of the switches receives the gate turn-off signal, and a second terminal of each of the switches receives the first signal.

3. The touch display apparatus as claimed in claim 1, wherein the control circuit sets the first signal to a high voltage every predetermined time period when the touch display apparatus enters the sleep state.

4. The touch display apparatus as claimed in claim 3, wherein the predetermined time period is greater than 0.5 second and less than 1 second.

5. The touch display apparatus as claimed in claim 1, wherein the control circuit further provides a forward scanning signal, a reverse scanning signal, a start signal, a clock signal, a reset signal, and a second signal to the gate driver and provides the gate turn-off signal and the first signal to the sleep driving circuit.

6. The touch display apparatus as claimed in claim 5, wherein the forward scanning signal, the reverse scanning signal, the start signal, the clock signal, the reset signal, the second signal, and the gate turn-off signal have a driving waveform identical to the first signal.

7. The touch display apparatus as claimed in claim 6, wherein the control circuit sets the second signal to a power-high voltage every predetermined time period when the touch display apparatus enters the sleep state.

8. The touch display apparatus as claimed in claim 5, wherein the forward scanning signal, the reverse scanning signal, the start signal, the clock signal, the reset signal, the first signal, and the second signal are signals with a power-low voltage when the touch display apparatus enters the sleep state.

9. The touch display apparatus as claimed in claim 5, wherein when the touch display apparatus enters the sleep state, the forward scanning signal, the reverse scanning signal, the start signal, the clock signal, the reset signal, and the second signal are signals with a ground voltage, the first signal is a power-low voltage, and the power-low voltage is less than the ground voltage.

10. The touch display apparatus as claimed in claim 1, wherein a plurality of display periods and a plurality of sensing periods are alternately arranged during a frame period.

\* \* \* \* \*